United States Patent
Atallah et al.

(10) Patent No.: US 8,466,592 B2
(45) Date of Patent: Jun. 18, 2013

(54) ELECTRICAL MACHINES

(75) Inventors: Kais Atallah, Sheffield (GB); Jan Jozef Rens, Sheffield (GB)

(73) Assignee: Magnomatics Limited, Sheffield (GB)

( * ) Notice: Subject to any disclaimer, the term of this patent is extended or adjusted under 35 U.S.C. 154(b) by 0 days.

(21) Appl. No.: 13/157,720

(22) Filed: Jun. 10, 2011

(65) Prior Publication Data

US 2012/0146442 A1 Jun. 14, 2012

Related U.S. Application Data (62) Division of application No. 12/298,444, filed as application No. PCT/GB2007/001456 on Apr. 23, 2007, now Pat. No. 7,982,351.

(30) Foreign Application Priority Data

Apr. 24, 2006 (GB) .................................... 0607994.1

(51) Int. Cl.
*H02K 16/02* (2006.01)

(52) U.S. Cl.
USPC ............................ 310/181; 310/103; 310/114

(58) Field of Classification Search
USPC ......................... 310/103–106, 112–114, 181
See application file for complete search history.

(56) References Cited

U.S. PATENT DOCUMENTS

| | | | |
|---|---|---|---|
| 4,032,800 A | 6/1977 | Droscher et al. | |
| 4,532,447 A | 7/1985 | Cibie | |
| 5,633,555 A * | 5/1997 | Ackermann et al. | 310/75 D |
| 5,675,203 A | 10/1997 | Schulze et al. | |
| 5,793,136 A | 8/1998 | Redzic | |
| 5,994,809 A | 11/1999 | Ackermann | |
| 6,002,193 A | 12/1999 | Canini et al. | |
| 6,049,152 A | 4/2000 | Nakano | |
| 6,121,705 A | 9/2000 | Hoong | |
| 6,262,508 B1 | 7/2001 | Shibayama et al. | |
| 6,335,606 B1 | 1/2002 | Minagawa et al. | |
| 6,794,781 B2 * | 9/2004 | Razzell et al. | 310/114 |
| 7,259,492 B2 | 8/2007 | Yang | |
| 7,548,005 B2 | 6/2009 | Kaizuka et al. | |
| 2001/0008354 A1 | 7/2001 | Minagawa | |
| 2004/0108781 A1 | 6/2004 | Razzell et al. | |
| 2004/0119373 A1 | 6/2004 | Akatsu | |
| 2005/0077802 A1 | 4/2005 | Toujima et al. | |
| 2005/0104465 A1 * | 5/2005 | Darday | 310/103 |

FOREIGN PATENT DOCUMENTS

| | | |
|---|---|---|
| CN | 1505109 | 6/2004 |
| DE | 4408719 | 7/1995 |
| EP | 0945963 | 9/1999 |

(Continued)

OTHER PUBLICATIONS

Atallah et al., "A Novel High-Performance Magnetic Gear", IEEE Transactions on Magnetics, Jul. 2001, 37(4), 2844-2846.

(Continued)

*Primary Examiner* — Dang Le
(74) *Attorney, Agent, or Firm* — Woodcock Washburn LLP (57) ABSTRACT

Embodiments provide an electrical machine bearing first and second pluralities of permanent magnets having different number of pole pairs, a plurality of pole-pieces that enable the magnetic interaction between the pluralities of permanent magnets, and winding that couples with the first/fundamental harmonic of the first plurality of permanent magnets to enable electromechanical energy conversion.

19 Claims, 5 Drawing Sheets

FOREIGN PATENT DOCUMENTS

| | | |
|---|---|---|
| EP | 1117173 | 7/2001 |
| EP | 1353436 | 10/2003 |
| EP | 1528659 | 5/2005 |
| GB | 2278242 | 11/1994 |
| JP | 2003-299327 | 10/2003 |
| WO | WO 99/17431 | 4/1999 |

OTHER PUBLICATIONS

Atallah et al., "Design, Analysis and Realisation of a High Performance Magnetic Gear", IEEE Proceedings—Electric Power Applications, 2004, 151, 135-143.

* cited by examiner

ELECTRICAL MACHINES

This is a division patent application of co-pending U.S. patent application Ser. No. 12/298,444, filed Jan. 20, 2009.

The present invention relates to electrical machines.

BACKGROUND OF THE INVENTION

Mechanical gearboxes are extensively used to match the operating speed of prime-movers to the requirements of their loads for both increasing the rotational speed such as, for example, in a wind-powered generator or reducing rotational speed such as, for example, in an electric-ship propulsion arrangement. It is usually more cost and weight effective to employ a high-speed electrical machine in conjunction with a mechanical gearbox to achieve requisite speed and torque characteristics. However, while such a high-speed electrical machine in conjunction with a mechanical gearbox allows high system torque densities to be realized, such mechanical gearboxes usually require lubrication and cooling. Furthermore, reliability can also be a significant issue. Consequently, direct drive electrical machines are employed in applications where a mechanical gearbox cannot be used.

There are various direct drive electrical machine topologies. One such topology is the permanent magnet rotary/linear homopolar (transverse-field) machine (TFM) that is known to offer the highest torque/force density. A rotary TFM has a torque density in the range of 40-60 kNm/m$^3$. However, homopolar machines have inherently poor power factors that are of the order of 0.3-0.45, which makes them unsuitable for electrical power generation. Furthermore, they require a significantly higher converter volt-ampere rating for motor applications.

BRIEF DESCRIPTION OF THE INVENTION

Accordingly, a first aspect of embodiments of the present invention provides an electrical machine comprising an inner moveable element and an outer moveable element arranged to interact in a magnetically geared manner via a plurality of permanent magnets associated with the inner moveable element; and a winding outwardly disposed relative to at least the inner moveable element arranged to interact magnetically with the fundamental harmonic of the magnetic field of the plurality of permanent magnets associated with the inner moveable element.

A second aspect of embodiments of the present invention provides an electrical machine comprising a first moveable element and a second moveable element arranged to interact in a magnetically geared manner via asynchronous harmonics of the first and second pluralities of permanent magnets, and a winding arranged to interact magnetically with the fundamental harmonic of the magnetic field of the first plurality of permanent magnets associated with the first moveable element.

A third aspect of embodiments of the present invention provides a method of operating an electrical machine comprising the steps of producing a magnetically motivated geared interaction between first and second moveable elements of the electrical machine by modulating a magnetic field associated with the first moveable element; and energizing a winding arranged to interact with the magnetic field associated with the first moveable element.

A fourth aspect of embodiments of the present invention provides an electrical machine comprising first and second moveable elements that interact in a magnetically geared manner, and a winding arranged to interact with the first/fundamental harmonic of the magnetic field of the first plurality of permanent magnets associated with the first moveable element.

Advantageously, electrical or electromechanical machines according to embodiments of the present invention exhibit high torque and/or force densities that are significantly greater than conventional high-performance rotary/linear electrical machines and that are at least as high as homopolar machines or TFMs. However, unlike homopolar machines or TFMs, embodiments of the present invention have a relatively high power factor. Some embodiments exhibit a power factor of 0.9 or higher.

BRIEF DESCRIPTION OF THE DRAWINGS

Embodiments of the present invention will now be described, by way of example only, with reference to the accompanying drawings in which.

DETAILED DESCRIPTION OF THE INVENTION

Figure 1:
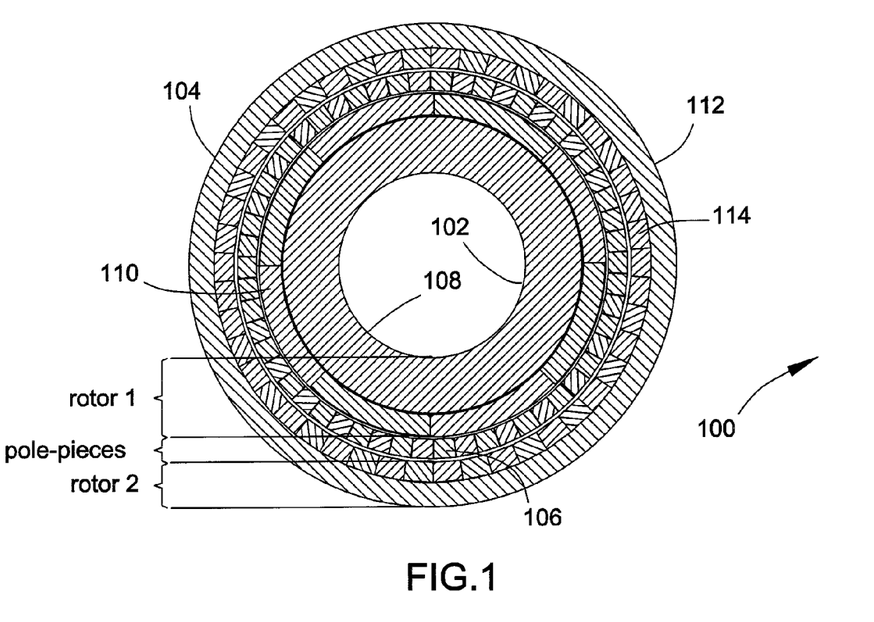
FIG. 1 depicts schematically a known rotary magnetic gear.

FIG. 1 shows a rotary magnetic gear 100 comprising a first or inner rotor 102, a second or outer rotor 104 and a number of pole pieces 106, otherwise known as an interference or an interference means. The first rotor 102 comprises a support 108 bearing a respective first number of permanent magnets 110. In the illustrated magnetic gear, the first rotor 102 comprises 8 permanent magnets or 4 pole-pairs arranged to produce a spatially varying magnetic field. The second rotor 104 comprises a support 112 bearing a respective second number of permanent magnets 114. The second rotor 104 illustrated comprises 46 permanent magnets or 23 pole-pairs arranged to produce a spatially varying field. The first and second numbers of permanent magnets are different. Accordingly, there will be little or no useful magnetic coupling or interaction between the permanents magnets 112 and 114 such that rotation of one rotor will not cause rotation of the other rotor.

The pole pieces 106 are used to allow the fields of the permanent magnets 110 and 114 to interact. The pole pieces 106 modulate the magnetic fields of the permanent magnets 110 and 114 so they interact to the extent that rotation of one rotor will induce rotation of the other rotor in a geared manner. Rotation of the first rotor at a speed $\omega_1$ will induce rotation of the second rotor at a speed $\omega_2$ where $\omega_1 > \omega_2$ and visa versa.

Figure 2:
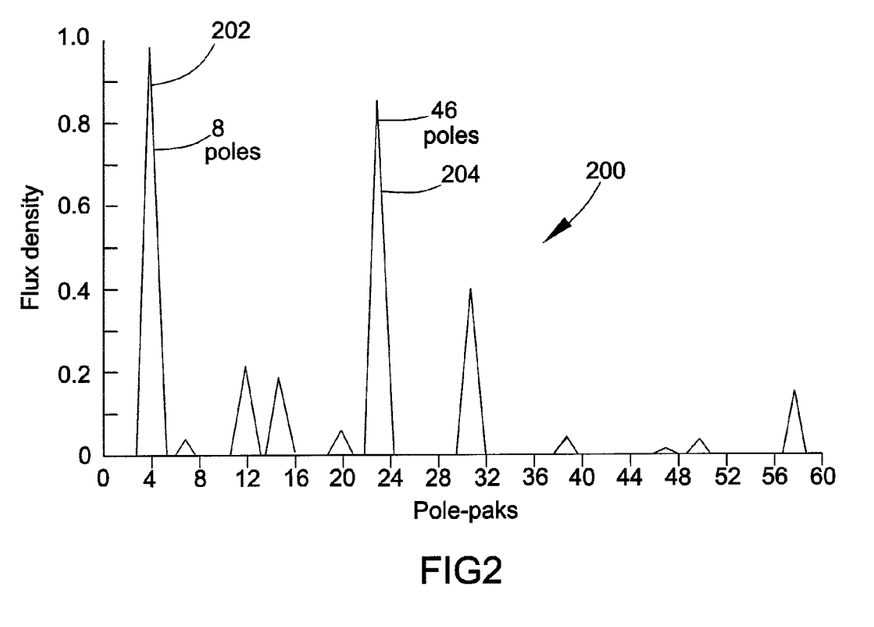
FIG. 2 illustrates magnetic harmonics associated with the assembly of FIG. 1.

FIG. 2 shows a harmonic spectrum 200 of the spatial distribution of the magnetic flux density of the permanent magnets 110 mounted on the inner rotor 102 of the magnetic gear 100 of FIG. 1, in the airgap adjacent to the permanent magnets 114 mounted on the outer rotor 104. It can be appreciated that the spectrum 200 comprises a first or fundamental harmonic 202 associated with the permanent magnets 110 of the first rotor 102. The pole pieces 106 modulate the magnetic field of the permanent magnets 110. For the permanent magnets 110, for example, this results in a relatively large asynchronous harmonic 204 having the same number of poles as the permanent magnets 114, which enables coupling between the first 102 and the second 104 rotors such that movement of one induces movement of the other, in a geared manner.

However, the fundamental component 202 associated with the permanent magnets 110 of the first rotor 102 is always present and is the source of the vast majority of electromagnetic losses associated with magnetic gears.

One skilled in the art understands how to select and design the pole pieces 106, given the first 110 and second 114 permanent magnets, to achieve the necessary magnetic circuit or coupling such that gearing between the first 102 and second 104 rotors results as can be appreciated from, for example, K. Atallah, D. Howe, "A novel high-performance magnetic gear", IEEE Transactions on Magnetics, Vol. 37, No. 4, pp. 2844-2846, 2001 and K. Atallah, S. D. Calverley, D. Howe, "Design, analysis and realization of a high performance magnetic gear", IEE Proceedings—Electric Power Applications, Vol. 151, pp. 135-143, 2004, which are incorporated herein by reference for all purposes and are included in the appendix.

Figure 3:
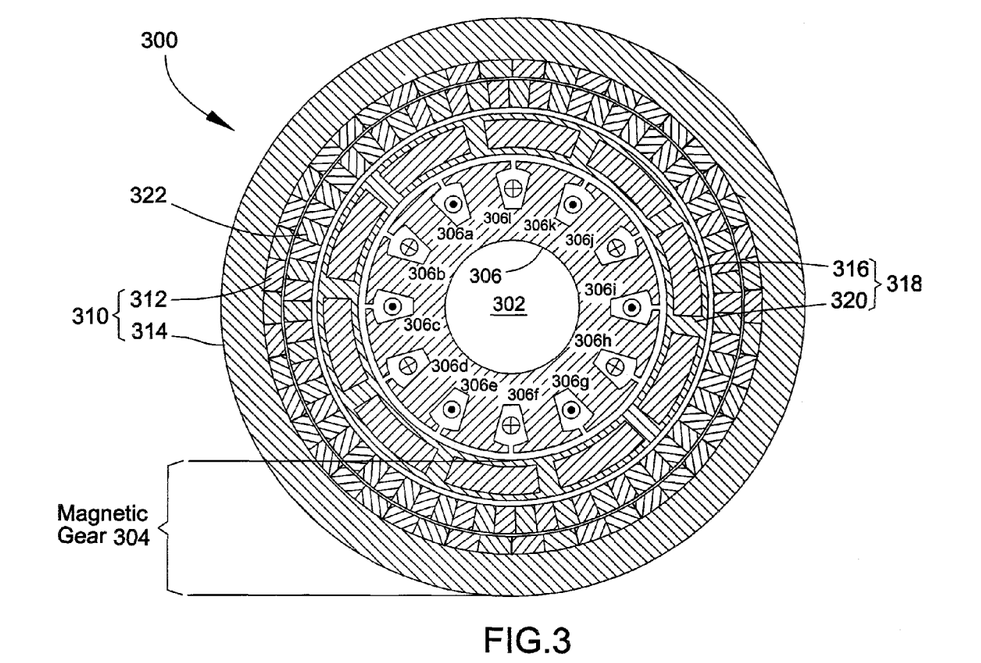
FIG. 3 shows schematically a prior art assembly comprising an electrical generator combined with a magnetic gear.

FIG. 3 shows a known assembly 300 comprising an electrical motor/generator 302 combined with a magnetic gear 304. The magnetic gear 304 is substantially similar to that described above with reference to FIG. 1. Such an assembly is depicted and described in various embodiments in U.S. Pat. No. 6,794,781. The electrical motor/generator 302 comprises a central armature 306 with respective 3-phase winding 306a-306l. The assembly 300 comprises a first or outer rotor 310 comprising permanent magnets 312 mounted on a substrate 314 such as, for example, a back-iron. The permanent magnets 312 are coupled, in a geared manner, to a number of permanent magnets 316 of a second/inner rotor 318. The permanent magnets 316 are mounted on a support 320. The magnetic circuit or coupling established between the permanent magnets 316 of the inner rotor 318 and the permanent magnets 312 of the outer rotor 310 is realized using a plurality of pole pieces 322 that are substantially equally circumferentially disposed relative to one another. The permanent magnets of the second rotor 318 couple with the 3-phase winding 306a-306l for motor/generator operations. The outer rotor 310 is rotatable. The pole pieces 322 are fixed, the inner rotor 318 is rotatable and the central armature 306 is fixed.

Figure 4:
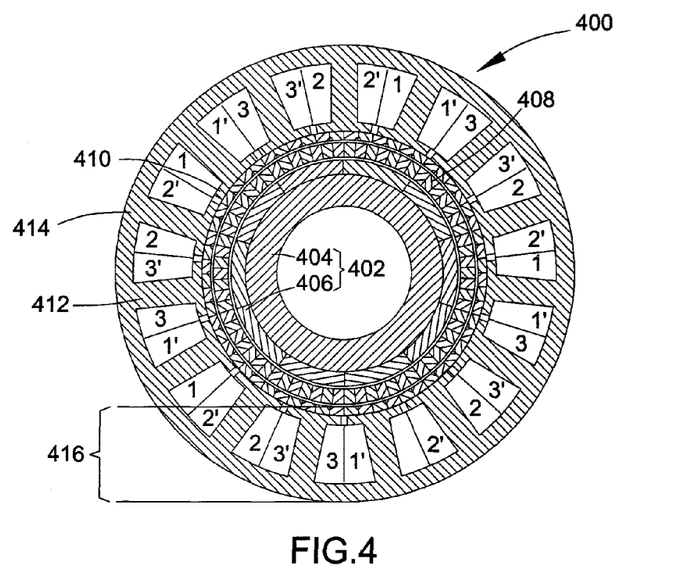
FIG. 4 depicts schematically a combined electrical machine and magnetic gear according to an embodiment.

FIG. 4 shows the principle of operation of an electrical machine 400 according to embodiments of the present invention. The electrical machine 400 comprises a first or inner rotor 402 having a support 404 bearing a first plurality of permanent magnets 406. In the embodiment shown, permanent magnets having 10 poles are used. However, embodiments are not limited to using such a number of permanent magnets. Embodiments can be realized that use some other number of permanent magnets. The electrical machine 400 comprises a second rotor 408 in the form of a plurality of ferromagnetic pole pieces. The pole pieces 408 are arranged to magnetically couple the permanent magnets 406 of the first/inner rotor 402 to a plurality of permanent magnets 410 that are fixed to a number of tooth tips 412 of respective teeth 414 thereby forming a stator 416. In the embodiment shown, 60 permanent magnets are fixed to the tooth tips 412. The embodiment comprises 15 teeth 414 with respective tooth tips 412. It will be appreciated that embodiments are not limited to such a number of permanent magnets and teeth. Embodiments comprising some other number of permanent magnets and teeth can be realized.

The pole pieces 408 are rotatable, that is, they form a rotor. The inner rotor 402 is rotatable. The teeth 414 and associated permanent magnets 410 are fixed. The coupling between the permanent magnets 406 and the permanent magnets 410 is realized using the rotatable pole pieces 408. Associated with the stator 416 is a plurality of 3-phase windings 1, 1', 2, 2' and 3, 3'. The 3-phase windings, and associated currents, are arranged to create magnetic fields that to couple with or form magnetic circuits with the first or fundamental harmonic of the permanent magnets 406 associated with the inner rotor 402. In the embodiment illustrated, the first/fundamental harmonic corresponding to the permanent magnets 406 has 5 pole-pairs.

By utilizing the hitherto unused fundamental harmonic associated with the inner rotor 402, the torque density and efficiency of the electrical machine are vastly improved. Embodiments provide an improved power factor of substantially 0.9 (max. 1), which represents approximately a 200%-300% increase in the power factor of the electrical machine as compared to TFMs.

Figure 5:
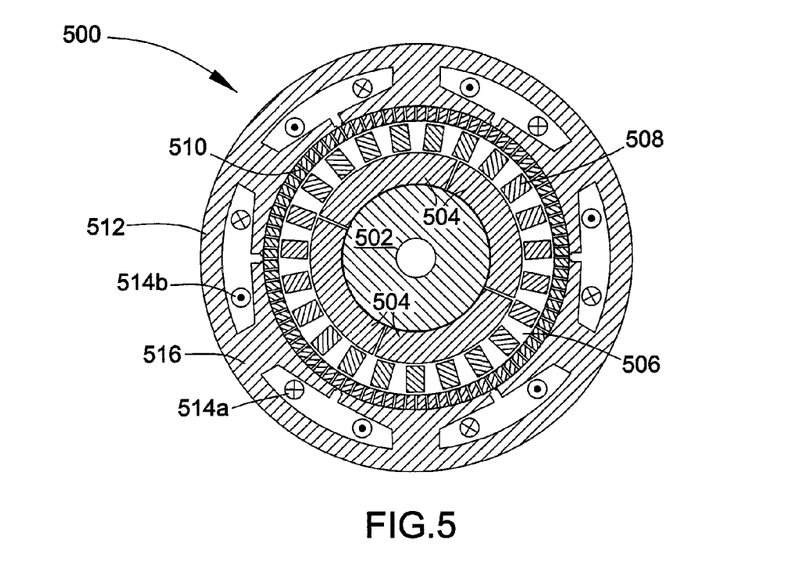
FIG. 5 depicts a combined electrical machine and magnetic gear according to a preferred embodiment.

FIG. 5 shows an electrical machine 500 according to a preferred embodiment of the present invention. The electrical machine 500 comprises an inner rotor 502 bearing a number of permanent magnets 504. In the illustrated embodiment, 4 pole permanent magnets are used. However, embodiments can be realised that use some other number of permanent magnets. The electrical machine 500 comprises an outer rotor 506 carrying a number of ferromagnetic pole pieces 508. In the illustrated embodiment, the outer rotor 506 carries 23 pole pieces that enable magnetic coupling between the permanent magnets 504 of the inner rotor 502 and a number of permanent magnets 510 that are mounted to a stator 512. The stator 512 comprises 3-phase windings 514a-514b associated with each of a plurality of teeth 516. The windings magnetically couple with the first harmonic of the permanent magnets 504. In preferred embodiment, the winding is 3-phase, but can equally well be some other type of winding such as, for example, 2-phase windings. The embodiment illustrated comprises 42 poles of permanents magnets 510 disposed on the stator 512. One skilled in the art understands that the crosses and points depicted with respect to the winding 514a-b illustrate the polarity of the coils. The pole pieces 508 of the outer rotor 506 are arranged to provide gearing between the inner rotor 502 and the outer rotor 506. In preferred embodiments, the gearing is such that the inner rotor 502 is a relatively high-speed rotor and the outer rotor 506 is a relatively low speed rotor. Preferred embodiments have a gear ratio of 11.5:1.

Figure 6:
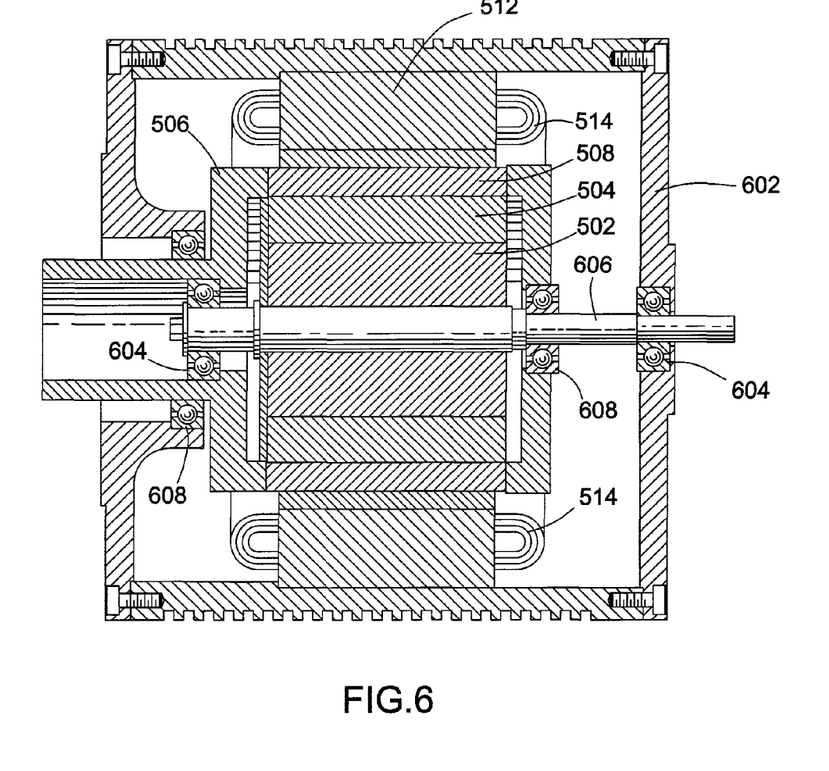
FIG. 6 shows an axial sectional view of the electrical machine of FIG. 5.

FIG. 6 shows an axial sectional view 600 of the electrical machine 500 shown in FIG. 5. It can be seen that the electrical machine 500 comprises a housing 602 that supports, via a plurality of bearings 604, a central spindle 606 on which the inner rotor 502 and associated permanent magnets 504 are mounted for rotation therewith. The outer rotor 506, comprising the associated pole pieces 508, is rotatably mounted between the spindle 606 and the housing 602 via respective bearings 608. It can be appreciated that the armature or stator 512 is fixed and disposed outwardly relative to the inner and outer rotors.

Figure 7:
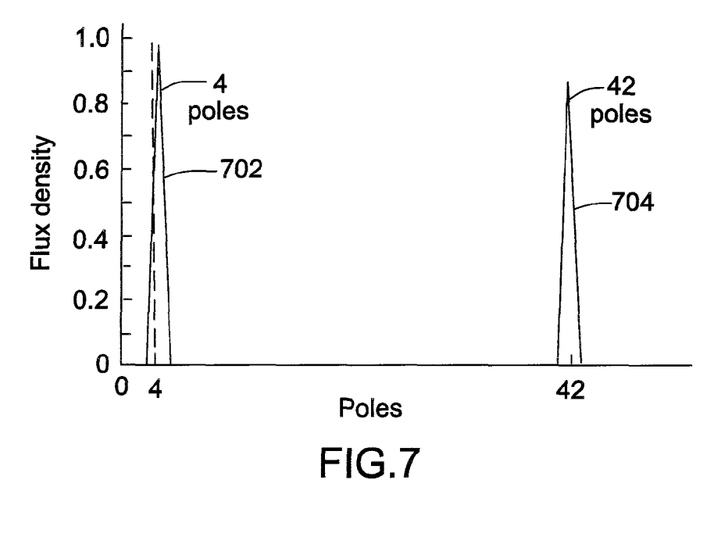
FIG. 7 illustrates magnetic harmonics associated with the combined electrical machine and magnetic gear of FIGS. 5 and 6.

FIG. 7 shows a spectrum 700 of the variation of magnetic flux density associated with permanent magnets 504 in the airgap adjacent to the permanent magnets 510 of the preferred embodiment of the electrical machine 500 of FIG. 5. It can be appreciated that the spectrum 700 comprises a first harmonic 702 associated with the permanent magnets 504 of the first rotor 502. The pole pieces 508 modulate the magnetic field of the permanent magnets 504 and generate a relatively large asynchronous harmonic 704 that has the same number of poles as the permanent magnets 510. In this embodiment, the first harmonic 702 associated with the permanent magnets 704 of the first rotor 502 couples with the windings 514*a-b* to establish electromechanical energy conversion, with a torque density comparable to TFMs, but with a much higher power factor.

Figure 8:
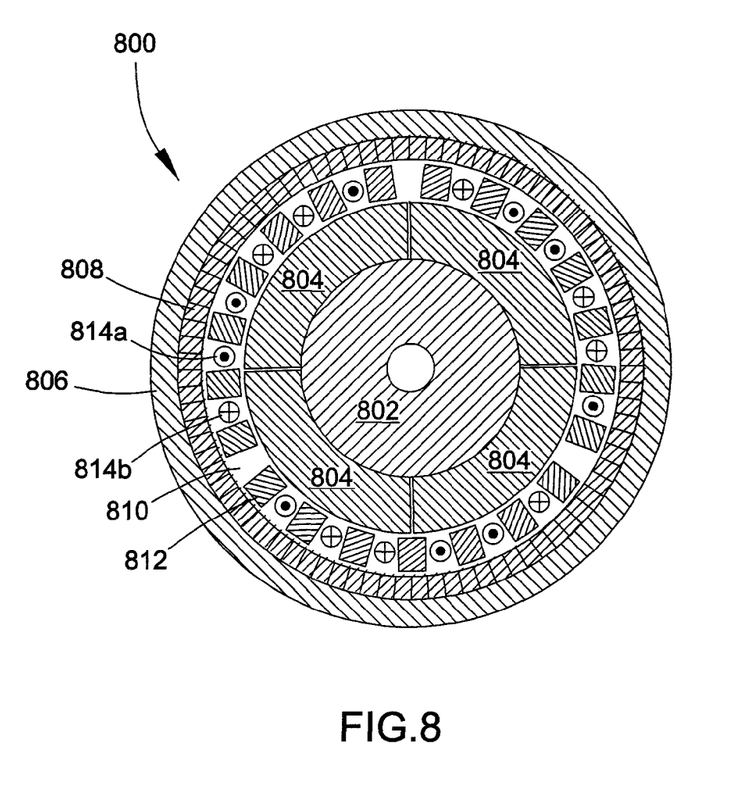
FIG. 8 illustrates an electrical machine according to a still further embodiment.

FIG. 8 shows an electrical machine 800 according to a further embodiment. The electrical machine 800 comprises an inner rotor 802 bearing a plurality of permanent magnets 804. In the illustrated embodiment, permanent magnets having 4 poles are illustrated but some other number of permanent magnets could equally well be used. The inner rotor 802 is preferably a relatively high-speed rotor. The electrical machine 800 comprises an outer rotor 806 bearing a plurality of permanent magnets 808. In the illustrated embodiment, permanent magnets 808 having 38 poles form part of the outer rotor 806. However, some other number of poles of permanent magnets 808 could be used. The electrical machine 800 comprises a stationary armature 810 bearing a plurality of pole pieces 812 and a 3-phase winding 814. The number of pole pieces in the embodiment is 21, although some other number of pole-pieces can be used in embodiments. It should be noted that the embodiment has been illustrated using a 3-phase winding. However, embodiments are not limited thereto. Embodiments can be realized that use some other windings such as, for example, a two phase winding. The second/outer rotor 806 forms a relatively low speed rotor that is magnetically coupled, in a geared manner, with the relatively high-speed first/timer rotor 802 via the pole pieces 812 of the stationary armature 810. One skilled in the art understands that the gear ratio is 19:1 and is related to the number of pole-pairs on the inner rotor 802 and the number of pole pieces. It will be appreciated that applying a current to the 3-phase windings 814 will cause the high-speed rotor 802 to rotate, which, in turn, will also cause the low speed rotor 806 to rotate. Again, it can be appreciated that the windings 814*a-b* couple with the first harmonic associated with the permanent magnets 804 of the first/inner rotor 802 to establish electromechanical energy conversion, with a torque density comparable to TFMs, but with much higher power factor.

Figure 9:
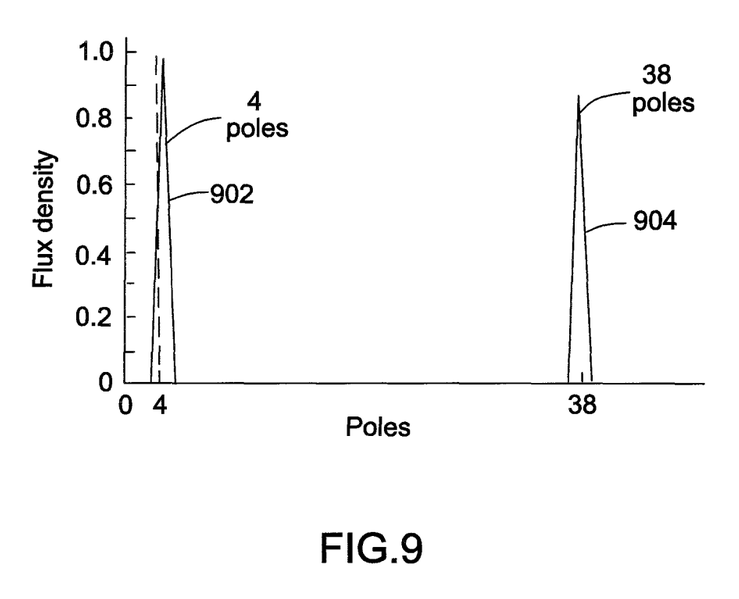
FIG. 9 magnetic harmonics associated with the combined electrical machine and magnetic gear of FIG. 8.

FIG. 9 shows a spectrum 900 of the variation of magnetic flux density associated with permanent magnets 804 in the airgap adjacent to the permanent magnets 808 of the preferred embodiment of the electrical machine 800 of FIG. 8. It can be appreciated that the spectrum 900 comprises a first harmonic 902 associated with the permanent magnets 804 of the first rotor 802.

The pole pieces 812 modulate the magnetic field of the permanent magnets 804 and generate a relatively large asynchronous harmonic 904 that has the same number of poles as the permanent magnets 808. In this embodiment, the first or fundamental harmonic 902 associated with the permanent magnets 904 of the first rotor 802 couples with the windings 814 to establish electromechanical energy conversion.

It will be appreciated that embodiments of the invention have been described with reference to electrical machines. One skilled in the art appreciates that such electrical machines can be used as motors or generators. Applying's 3-phase supply to the windings results in a geared electrical motor. However, rotating one of the rotors 502/508 or 802/806 results in the electrical machine being used as a geared generator. Furthermore, although the above embodiments have been described with reference to using a 3-phase winding, embodiments are not limited to such an arrangement. Embodiments can be realized in which some other form of winding such as, for example, a 2-phase windings, is used.

Embodiments of the present invention can also be realized in the form of radial field rotary electrical machines and axial field rotary electrical machines.

The invention claimed is:

1. A method of generating electricity comprising:
    operating an electrical machine that produces a magnetically motivated geared interaction between first and second moveable elements of the electrical machine by modulating a magnetic field associated with the first moveable element and has a winding arranged to interact with the magnetic field associated with the first moveable element, wherein the winding is mounted on a stationary armature that bears a plurality of permanent magnets; and
    moving said second moveable element to induce movement of said first moveable element, through a magnetic gear action, to cause a magnetic interaction between the first or fundamental harmonic of the magnetic field associated with the first moveable element and the winding such that a voltage is induced in the winding.

2. A method of generating kinetic energy comprising:
    operating an electrical machine that produces a magnetically motivated geared interaction between first and second moveable elements of the electrical machine by modulating a magnetic field associated with the first moveable element and energizing a winding associated with a stator, the winding arranged to interact with the magnetic field associated with the first moveable element; and
    inducing movement of said first moveable element by providing electrical power to the windings which produces a rotating field that has a pole number that matches the pole number of a first plurality of permanent magnets on the first moveable element, which in turn induces a motion of the second moveable element due to the magnetic interaction of pole pieces on the second moveable element with a second plurality of permanent magnets associated with the stator of the electrical machine.

3. The method of claim 2, wherein an array of pole pieces modulates an airgap magnetic field associated with a first array of permanent magnets on the first movable element to create a spatial harmonic in the airgap magnetic field that has the same pole number as a second array of permanent magnets and travels at a speed that is asynchronous to the first moveable element.

4. The method of claim 2, wherein an array of pole pieces modulates an airgap magnetic field associated with the first plurality of permanent magnets on the first movable element to create a spatial harmonic in the airgap magnetic field that has the same pole number as the second plurality of permanent magnets and travels at a speed that is asynchronous to the first moveable element.

5. An electrical machine comprising:
    first and second moveable elements that interact in a magnetically geared manner; and
    a winding arranged to interact with the first fundamental harmonic of a magnetic field of a first plurality of permanent magnets associated with the first moveable element, wherein the winding are mounted on a stationary armature that bears a second plurality of permanent magnets.

6. The electrical machine of claim 5 further comprising a plurality of pole pieces for modulating the magnetic field of the at least one of the first plurality of permanent magnets and the second plurality of permanent magnets and to enable said geared interaction.

7. The electrical machine of claim 6, wherein the second moveable element comprises the plurality of pole pieces.

8. The electrical machine of claim 5, wherein the first moveable element is disposed inwardly of the second moveable element.

9. The electrical machine of claim 5, wherein the winding is operable to receive a current to produce said interaction with the fundamental harmonic of the first plurality of permanent magnets.

10. The electrical machine of claim 5, wherein the winding is operable to generate power in response to said interaction with the fundamental harmonic of the first plurality of permanent magnets.

11. The electrical machine of claim 5, wherein the first and second moveable elements are linearly moveable translators.

12. The electrical machine of claim 5, wherein the first and second moveable elements are rotationally moveable rotors.

13. The electrical machine of claim 5, wherein the second moveable element is operable to generate kinetic energy in response to said interaction with the fundamental harmonic of the first plurality of permanent magnets, such that the electrical machine is capable of performing as a motor.

14. The electrical machine of claim 5, wherein the winding is inwardly disposed relative to the first and second moveable elements.

15. The electrical machine of claim 5, wherein the winding is outwardly disposed relative to the first and second moveable elements.

16. The electrical machine of claim 5, further comprising a plurality of pole pieces and a medium located between the plurality of pole pieces and the first and second plurality of permanent magnets such that they are rotatable relative to each other.

17. The electrical machine according to claim 5, wherein the first moveable element is disposed outwardly of the second moveable element.

18. The electrical machine according to claim 5, further comprising a plurality of pole pieces that modulates the magnetic field of the first plurality of permanent magnets to create an airgap magnetic field which can couple with a magnetic field associated with the second plurality of permanent magnets, such that when the first moveable element rotates the second moveable element rotates at a geared lower speed.

19. The electrical machine according to claim 5, wherein the second moveable element bears pole pieces and is moveable at a speed relative to the speed at which the first moveable element is moveable, wherein the relative speed is determined by a ratio of the numbers of poles in the first and second plurality of permanent magnets.

* * * * *